United States Patent
S et al.

(10) Patent No.: US 12,437,074 B2
(45) Date of Patent: Oct. 7, 2025

(54) MODERN SCALABLE FLASH FIRMWARE ARCHITECTURE

(71) Applicant: DELL PRODUCTS L.P., Round Rock, TX (US)

(72) Inventors: Shekar Babu S, Bangalore (IN); Gowtham Moorthy, Namakkal (IN)

(73) Assignee: Dell Products L.P., Round Rock, TX (US)

( * ) Notice: Subject to any disclaimer, the term of this patent is extended or adjusted under 35 U.S.C. 154(b) by 119 days.

(21) Appl. No.: 18/364,511

(22) Filed: Aug. 3, 2023

(65) Prior Publication Data

US 2025/0045402 A1    Feb. 6, 2025

(51) Int. Cl.
G06F 15/177    (2006.01)
G06F 9/00    (2018.01)
G06F 21/57    (2013.01)

(52) U.S. Cl.
CPC ............................. G06F 21/572 (2013.01)

(58) Field of Classification Search
CPC .................................................. G06F 21/572
See application file for complete search history.

(56) References Cited

U.S. PATENT DOCUMENTS

| | | |
|---|---|---|
| 10,860,307 B2 | 12/2020 | Suryanarayana et al. |
| 11,567,747 B2 | 1/2023 | Chiu et al. |
| 2017/0147329 A1* | 5/2017 | Shutt .................. G06F 8/654 |
| 2020/0285461 A1* | 9/2020 | Kumar .............. G06F 9/4401 |
| 2020/0326930 A1 | 10/2020 | Suryanarayana et al. |
| 2021/0081213 A1 | 3/2021 | Kondapi et al. |
| 2023/0112734 A1* | 4/2023 | Suryanarayana ..... H04L 9/3247 717/170 |

* cited by examiner

*Primary Examiner* — Xuxing Chen
(74) *Attorney, Agent, or Firm* — Larson Newman, LLP

(57) ABSTRACT

An information handling system includes a flash memory having a basic input/output system (BIOS) firmware image having a modular file structure and a segment offset table that identifies offsets of a first set of modules including the firmware image. The system collects a second set of modules from a BIOS firmware update payload and maps the second set of modules to the first set of modules in the flash memory. The system also updates the BIOS firmware image with the second set of modules based on the offsets in the segment offset table.

20 Claims, 9 Drawing Sheets

MODERN SCALABLE FLASH FIRMWARE ARCHITECTURE

FIELD OF THE DISCLOSURE

The present disclosure generally relates to information handling systems, and more particularly relates to a scalable flash firmware architecture.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system includes a flash memory having a basic input/output system (BIOS) firmware image having a modular file structure and a segment offset table that identifies offsets of a first set of modules including the firmware image. The system collects a second set of modules from a BIOS firmware update payload and maps the second set of modules to the first set of modules in the flash memory. The system also updates the BIOS firmware image with the second set of modules based on the offsets in the segment offset table.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
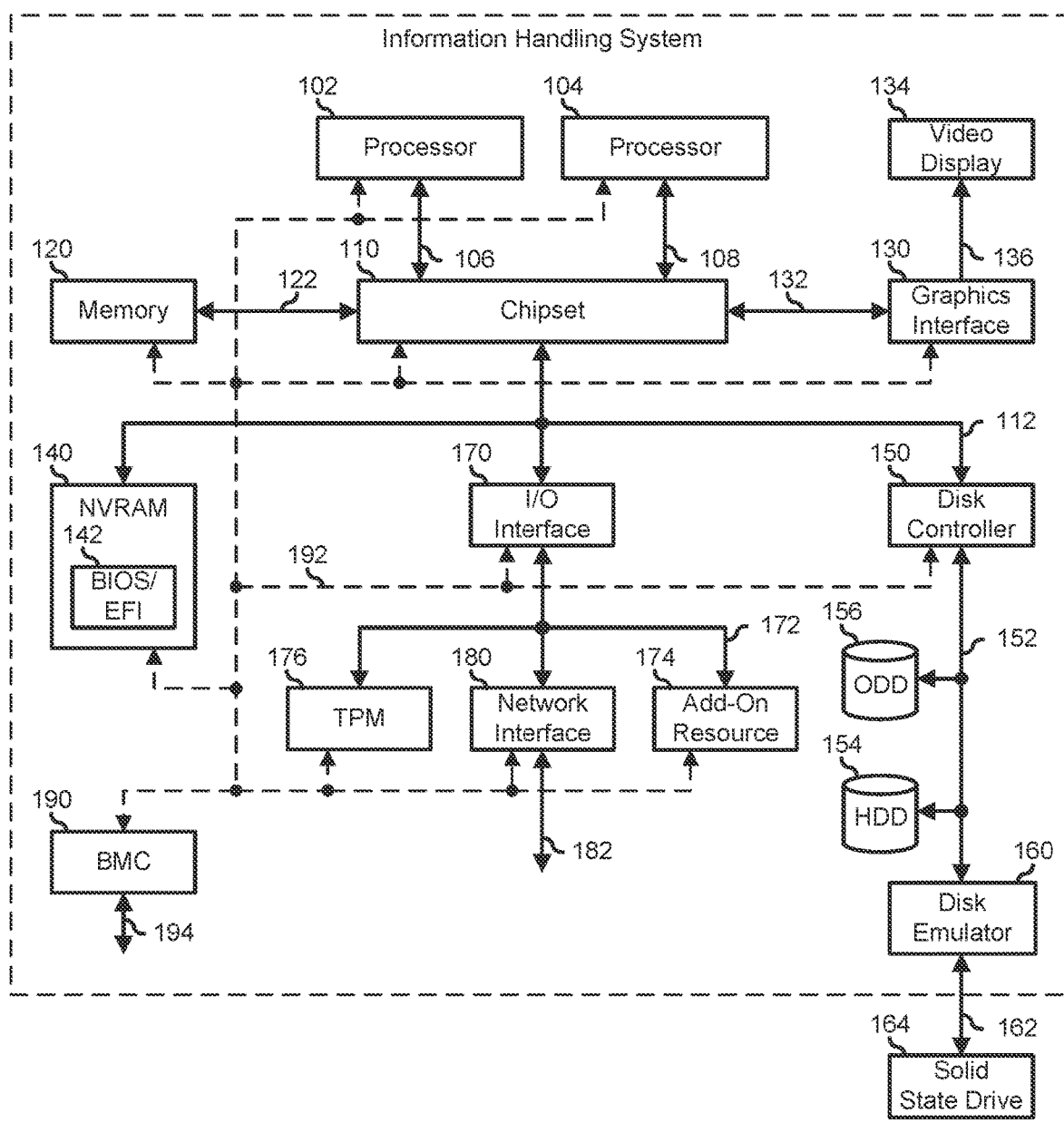
FIG. 1 is a block diagram illustrating an information handling system according to an embodiment of the present disclosure.

FIG. 1 illustrates an embodiment of an information handling system 100 including processors 102 and 104, a chipset 110, a memory 120, a graphics adapter 130 connected to a video display 134, a non-volatile RAM (NV-RAM) 140 that includes a basic input and output system/extensible firmware interface (BIOS/EFI) module 142, a disk controller 150, a hard disk drive (HDD) 154, an optical disk drive 156, a disk emulator 160 connected to a solid-state drive (SSD) 164, an input/output (I/O) interface 170 connected to an add-on resource 174 and a trusted platform module (TPM) 176, a network interface 180, and a baseboard management controller (BMC) 190. Processor 102 is connected to chipset 110 via processor interface 106, and processor 104 is connected to the chipset via processor interface 108. In a particular embodiment, processors 102 and 104 are connected together via a high-capacity coherent fabric, such as a HyperTransport link, a QuickPath Interconnect, or the like. Chipset 110 represents an integrated circuit or group of integrated circuits that manage the data flow between processors 102 and 104 and the other elements of information handling system 100. In a particular embodiment, chipset 110 represents a pair of integrated circuits, such as a northbridge component and a southbridge component. In another embodiment, some or all of the functions and features of chipset 110 are integrated with one or more of processors 102 and 104.

Memory 120 is connected to chipset 110 via a memory interface 122. An example of memory interface 122 includes a Double Data Rate (DDR) memory channel and memory 120 represents one or more DDR Dual In-Line Memory Modules (DIMMs). In a particular embodiment, memory interface 122 represents two or more DDR channels. In another embodiment, one or more of processors 102 and 104 include a memory interface that provides a dedicated memory for the processors. A DDR channel and the connected DDR DIMMs can be in accordance with a particular DDR standard, such as a DDR3 standard, a DDR4 standard, a DDR5 standard, or the like.

Memory 120 may further represent various combinations of memory types, such as Dynamic Random Access Memory (DRAM) DIMMs, Static Random Access Memory (SRAM) DIMMs, non-volatile DIMMs (NV-DIMMs), storage class memory devices, Read-Only Memory (ROM) devices, or the like. Graphics adapter 130 is connected to chipset 110 via a graphics interface 132 and provides a video display output 136 to a video display 134. An example of a graphics interface 132 includes a Peripheral Component Interconnect-Express (PCIe) interface and graphics adapter 130 can include a four-lane (×4) PCIe adapter, an eight-lane (×8) PCIe adapter, a 16-lane (×16) PCIe adapter, or another configuration, as needed or desired. In a particular embodiment, graphics adapter 130 is provided down on a system printed circuit board (PCB). Video display output 136 can include a Digital Video Interface (DVI), a High-Definition Multimedia Interface (HDMI), a DisplayPort interface, or the like, and video display 134 can include a monitor, a smart television, an embedded display such as a laptop computer display, or the like.

NV-RAM 140, disk controller 150, and I/O interface 170 are connected to chipset 110 via an I/O channel 112. An example of I/O channel 112 includes one or more point-to-point PCIe links between chipset 110 and each of NV-RAM 140, disk controller 150, and I/O interface 170. Chipset 110 can also include one or more other I/O interfaces, including a PCIe interface, an Industry Standard Architecture (ISA) interface, a Small Computer Serial Interface (SCSI) interface, an Inter-Integrated Circuit ($I^2C$) interface, a System Packet Interface, a Universal Serial Bus (USB), another interface, or a combination thereof. NV-RAM 140 includes BIOS/EFI module 142 that stores machine-executable code (BIOS/EFI code) that operates to detect the resources of information handling system 100, to provide drivers for the resources, to initialize the resources, and to provide common access mechanisms for the resources. The functions and features of BIOS/EFI module 142 will be further described below.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits SSD 164 to be connected to information handling system 100 via an external interface 162. An example of external interface 162 includes a USB interface, an institute of electrical and electronics engineers (IEEE) 1394 (Firewire) interface, a proprietary interface, or a combination thereof. Alternatively, SSD 164 can be disposed within information handling system 100.

I/O interface 170 includes a peripheral interface 172 that connects the I/O interface to add-on resource 174, to TPM 176, and to network interface 180. Peripheral interface 172 can be the same type of interface as I/O channel 112 or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral interface 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board, or add-in card disposed within information handling system 100, a device that is external to the information handling system, or a combination thereof.

Network interface 180 represents a network communication device disposed within information handling system 100, on a main circuit board of the information handling system, integrated onto another component such as chipset 110, in another suitable location, or a combination thereof. Network interface 180 includes a network channel 182 that provides an interface to devices that are external to information handling system 100. In a particular embodiment, network channel 182 is of a different type than peripheral interface 172, and network interface 180 translates information from a format suitable to the peripheral channel to a format suitable to external devices.

In a particular embodiment, network interface 180 includes a NIC or host bus adapter (HBA), and an example of network channel 182 includes an InfiniBand channel, a Fibre Channel, a Gigabit Ethernet channel, a proprietary channel architecture, or a combination thereof. In another embodiment, network interface 180 includes a wireless communication interface, and network channel 182 includes a Wi-Fi channel, a near-field communication (NFC) channel, a Bluetooth® or Bluetooth-Low-Energy (BLE) channel, a cellular based interface such as a Global System for Mobile (GSM) interface, a Code-Division Multiple Access (CDMA) interface, a Universal Mobile Telecommunications System (UMTS) interface, a Long-Term Evolution (LTE) interface, or another cellular based interface, or a combination thereof. Network channel 182 can be connected to an external network resource (not illustrated). The network resource can include another information handling system, a data storage system, another network, a grid management system, another suitable resource, or a combination thereof.

BMC 190 is connected to multiple elements of information handling system 100 via one or more management interface 192 to provide out of band monitoring, maintenance, and control of the elements of the information handling system. As such, BMC 190 represents a processing device different from processor 102 and processor 104, which provides various management functions for information handling system 100. For example, BMC 190 may be responsible for power management, cooling management, and the like. The term BMC is often used in the context of server systems, while in a consumer-level device, a BMC may be referred to as an embedded controller (EC). A BMC included in a data storage system can be referred to as a storage enclosure processor. A BMC included at a chassis of a blade server can be referred to as a chassis management controller and ECs included at the blades of the blade server can be referred to as blade management controllers. Capabilities and functions provided by BMC 190 can vary considerably based on the type of information handling system. BMC 190 can operate in accordance with an Intelligent Platform Management Interface (IPMI). Examples of BMC 190 include an Integrated Dell® Remote Access Controller (iDRAC).

Management interface 192 represents one or more out-of-band communication interfaces between BMC 190 and the elements of information handling system 100, and can include a $I^2C$ bus, a System Management Bus (SMBus), a Power Management Bus (PMBUS), a Low Pin Count (LPC) interface, a serial bus such as a Universal Serial Bus (USB) or a Serial Peripheral Interface (SPI), a network interface such as an Ethernet interface, a high-speed serial data link such as a PCIe interface, a Network Controller Sideband Interface (NC-SI), or the like. As used herein, out-of-band access refers to operations performed apart from a BIOS/operating system execution environment on information handling system 100, that is apart from the execution of code by processors 102 and 104 and procedures that are implemented on the information handling system in response to the executed code.

BMC 190 operates to monitor and maintain system firmware, such as code stored in BIOS/EFI module 142, option ROMs for graphics adapter 130, disk controller 150, add-on resource 174, network interface 180, or other elements of information handling system 100, as needed or desired. In particular, BMC 190 includes a network interface 194 that can be connected to a remote management system to receive firmware updates, as needed or desired. Here, BMC 190 receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image.

BMC 190 utilizes various protocols and application programming interfaces (APIs) to direct and control the processes for monitoring and maintaining the system firmware. An example of a protocol or API for monitoring and maintaining the system firmware includes a graphical user interface (GUI) associated with BMC 190, an interface defined by the Distributed Management Taskforce (DMTF) (such as a Web Services Management (WSMan) interface, a Management Component Transport Protocol (MCTP) or, a Redfish® interface), various vendor defined interfaces (such as a Dell EMC Remote Access Controller Administrator (RACADM) utility, a Dell EMC OpenManage Enterprise, a Dell EMC OpenManage Server Administrator (OMSS) utility, a Dell EMC OpenManage Storage Services (OMSS) utility, or a Dell EMC OpenManage Deployment Toolkit (DTK) suite), a BIOS setup utility such as invoked by a "F2" boot option, or another protocol or API, as needed or desired.

In a particular embodiment, BMC 190 is included on a main circuit board (such as a baseboard, a motherboard, or any combination thereof) of information handling system 100 or is integrated onto another element of the information handling system such as chipset 110, or another suitable element, as needed or desired. As such, BMC 190 can be part of an integrated circuit or a chipset within information handling system 100. An example of BMC 190 includes an iDRAC, or the like. BMC 190 may operate on a separate power plane from other resources in information handling system 100. Thus BMC 190 can communicate with the management system via network interface 194 while the resources of information handling system 100 are powered off. Here, information can be sent from the management system to BMC 190 and the information can be stored in a RAM or NV-RAM associated with the BMC. Information stored in the RAM may be lost after power-down of the power plane for BMC 190, while information stored in the NV-RAM may be saved through a power-down/power-up cycle of the power plane for the BMC.

Information handling system 100 can include additional components and additional busses, not shown for clarity. For example, information handling system 100 can include multiple processor cores, audio devices, and the like. While a particular arrangement of bus technologies and interconnections is illustrated for the purpose of example, one of skill will appreciate that the techniques disclosed herein are applicable to other system architectures. Information handling system 100 can include multiple central processing units (CPUs) and redundant bus controllers. One or more components can be integrated together. Information handling system 100 can include additional buses and bus protocols, for example, I$^2$C and the like. Additional components of information handling system 100 can include one or more storage devices that can store machine-executable code, one or more communications ports for communicating with external devices, and various input and output (I/O) devices, such as a keyboard, a mouse, and a video display.

For purposes of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smartphone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as processor 102, a programmable logic array (PLA), an embedded device such as a System-on-a-Chip (SoC), or other control logic hardware. Information handling system 100 can also include one or more computer-readable media for storing machine-executable code, such as software or data.

A flash file system normally refers to a file system designed for storing files on flash memory-based storage devices. While flash file systems are closely related to file systems in general, they are optimized for the nature and characteristics of flash memory. The traditional firmware flash-file structure does not support true modular file updates at a sector level. With a current firmware image build process the flash offsets are fixed for a file in firmware volume, and it has no intelligence built to accommodate a file with modified content and extended size. As such, updates are performed by erasing the entire SPI chip and doing a reflash even if an update is minimal and of only a few kilobytes. This process is slow and time-consuming which often results in a bad user experience during which the information handling system may be unavailable for use by the user. Some firmware updates may even require multiple reboots. To address these and other concerns, the present disclosure provides a system and method to create a modern flash file layout and handle file dependencies by mapping them to SPI flash offsets.

Figure 2:
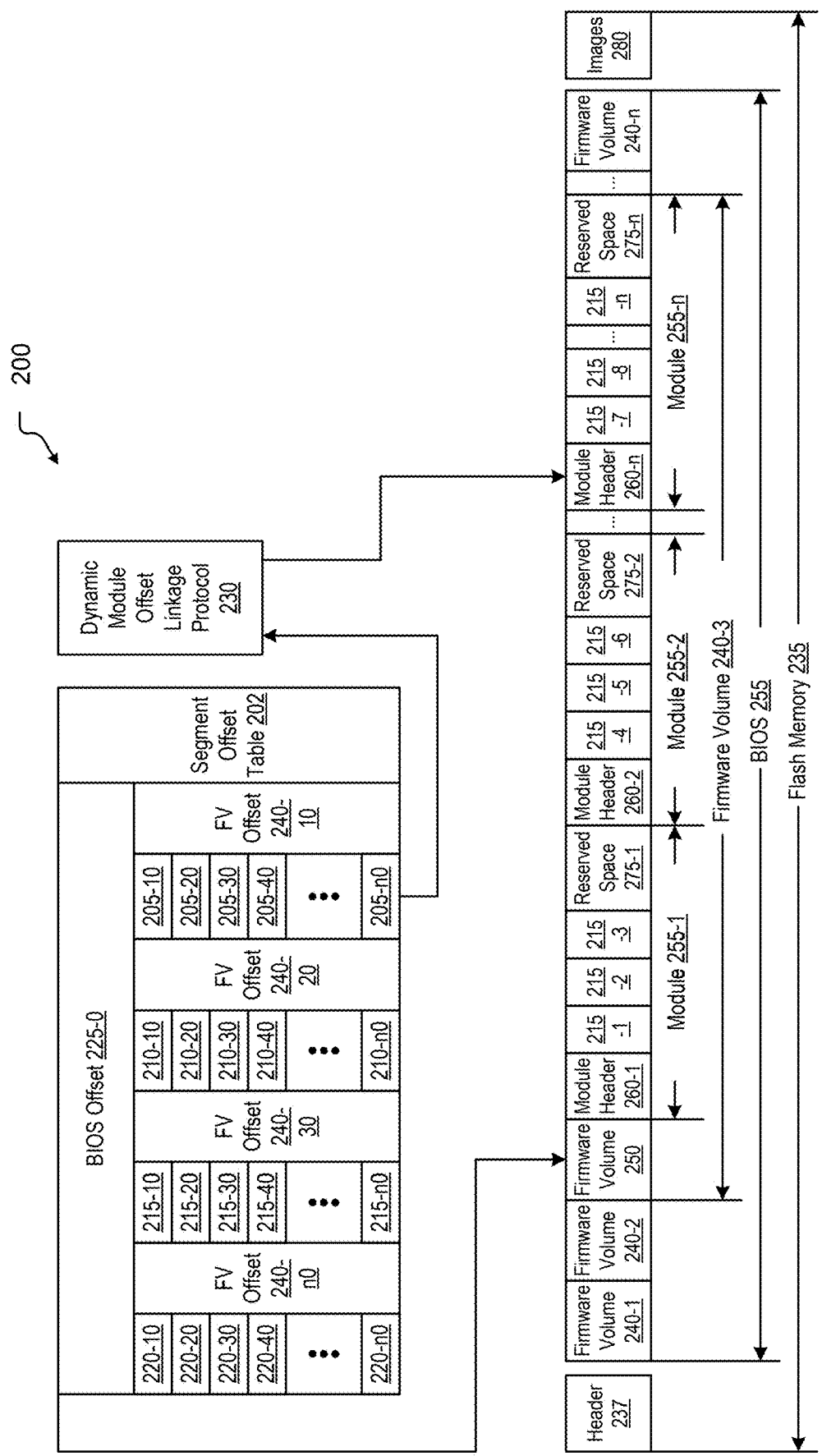
FIG. 2 is a diagram of a flash firmware architecture, according to an embodiment of the present disclosure.

FIG. 2 shows a diagram of a flash firmware architecture 200 configured to dynamically accommodate sector-wise flash updates. Architecture 200 may be configured to be scalable and to accommodate firmware flash updates at a sector level. For example, architecture 200 may support a flash file structure depicted in FIG. 3 extensions across modules, firmware volumes within an image, and is capable to be extended over a non-volatile memory namespace. Architecture 200 includes a firmware flash layout of flash memory 235, a segment offset table 202, and a dynamic module offset linkage protocol 230. Flash memory 235 may be a memory like an SPI flash that is associated with an information handling system such as information handling system 100. In particular, flash memory 235 may be similar to NVRAM 140 of FIG. 1 which may be configured to handle modular updates to flash memory 235. The components shown are not drawn to scale and may include additional or fewer components. The depicted architecture does not convey or imply any architectural or other limitations with respect to the presently described embodiments and/or the general disclosure. In the discussion of the figures, reference may also be made to components illustrated in other figures for continuity of the description.

In one embodiment, flash memory 235 includes a header 237, a BIOS 225, and images 280. Images 280 may include an embedded controller firmware image, a management engine firmware image, etc. Each firmware image may include a collection of firmware routines, device drivers, and/or other software programs. A particular firmware image is typically assigned a revision or version number identifying the collection of routines or files included in the firmware. Firmware images include one or more firmware volumes for code repository. For example, BIOS 225 includes firmware volumes 240-1 through 240-n. Each firmware volume includes a firmware volume header and one or more modules. For example, firmware volume 240-3 includes a firmware volume header 250 and a set of modules, such as modules 255-1 through 255-n. A firmware volume header may include attributes or data fields associated with a firmware volume, such as a UEFI globally unique identifier, size, format, red-write permissions, etc.

Each module includes a module header, one or more drivers or files, and a reserved space. For example, module 255-1 includes a module header 260-1, drivers 215-1, 215-2, and 215-3, and a reserved space 275-1. Module 255-2 includes a module header 260-2, drivers 215-4, 215-5, and 215-6, and a reserved space 275-2. Accordingly, module 255-n includes a module header 260-n, drivers 215-7 through 215-n, and reserved space 275-n. Module headers include attributes or data fields associated with the module, such as a dependency module list, a hash value, length, an offset, and a signature. A reserved space may be configured as an extensible memory pool. During updates, if the update data exceeds an allotted space, overflow update data may be stored in one or more reserved spaces. For example, if an update for driver 215-1 is greater than the space allotted for driver 215, overflow data may be stored in reserved space 275-1. If reserved space 275-1 is still not enough, additional overflow data may be stored in the next available reserved space, such as reserved space 275-2, and so on.

Segment offset table 202, which is maintained at firmware volume header 250, is an embedded module offset linkage table that may be configured to support dynamic linkages and rollbacks. Segment offset table 202, also referred to herein as a flash offset map, may be configured to handle existing platform offset definitions of a selected module on flash memory 235 of a user's information handling system. In addition, segment offset table 202 can handle offsets of a new payload with modular patches that may be included in a firmware update payload package, such as one depicted in FIG. 3. Segment offset table 202 includes offsets to images stored in the flash memory. In particular, segment offset table 202 includes offsets to firmware volumes, modules, and drivers or files. In this example, segment offset table 202 includes BIOS Offset 225-0 which is an offset for BIOS-225. BIOS Offset 225-0 includes offsets to firmware volume offsets 240-10 to 240-n0 which are offsets to firmware volumes 240-1 through 240-n, respectively. Each firmware volume offset is associated with the driver or file offsets of the drivers or files in the firmware volume, respectively. For example, firmware volume offset 240-10 includes driver offsets 205-10 through 205-n0. Firmware volume offset 240-20 includes driver offsets 210-10 through 210-n0. Firmware volume offset 240-30 includes driver offsets 215-10 through 215-n0. Accordingly, firmware volume offset 240-n0 includes driver offsets 220-10 through 220-n0. Although not shown, firmware volume offsets may also include offsets to firmware modules. For example, firmware volume offset 240-3 may include offsets to modules 255-1 through 255-n.

Dynamic module offset linkage protocol 230 may be configured to track firmware update offsets via segment offset table 202. For example, dynamic module offset linkage protocol 230 may enable scaling of delta updates across modules or firmware modules within an image to ensure module size extension is accommodated without interruptions. Accordingly, dynamic offset linkage protocol 230 may also load a split module from different offsets associated with flash memory 235 as a whole chunk to be executed one time. For example, if a portion of a driver or a file is stored in driver 215-1 and another portion is stored in reserved space 275-1. The driver may be loaded and executed as a whole via segment offset table 202. For example, a driver dispatch may identify and combine the portions stored in driver 215-1 and reserved space 275-1 as a single driver at runtime and dispatch.

Dynamic module offset linkage protocol 230 may also dynamically link overflow offsets, which may be associated with overflow update data when an update to a particular driver or file exceeds the allotted size in the module. Dynamic module offset linkage protocol 230 may handle the overflow offsets by injecting the overflow update data during the load time of the module based on offset values in segment offset table 202. For example, if the driver or file mentioned above is updated, and the update is stored in reserved space 275-2, dynamic module offset linkage protocol 230 may also track the update in reserved space 275-2 at load time via segment offset table 202. This is because dynamic offset linkage protocol 230 can track updates in a modified region of flash memory 235 by identifying delta changes between the current payload stored for BIOS 225 and the BIOS firmware update based on offsets in segment offset table 202.

Figure 3:
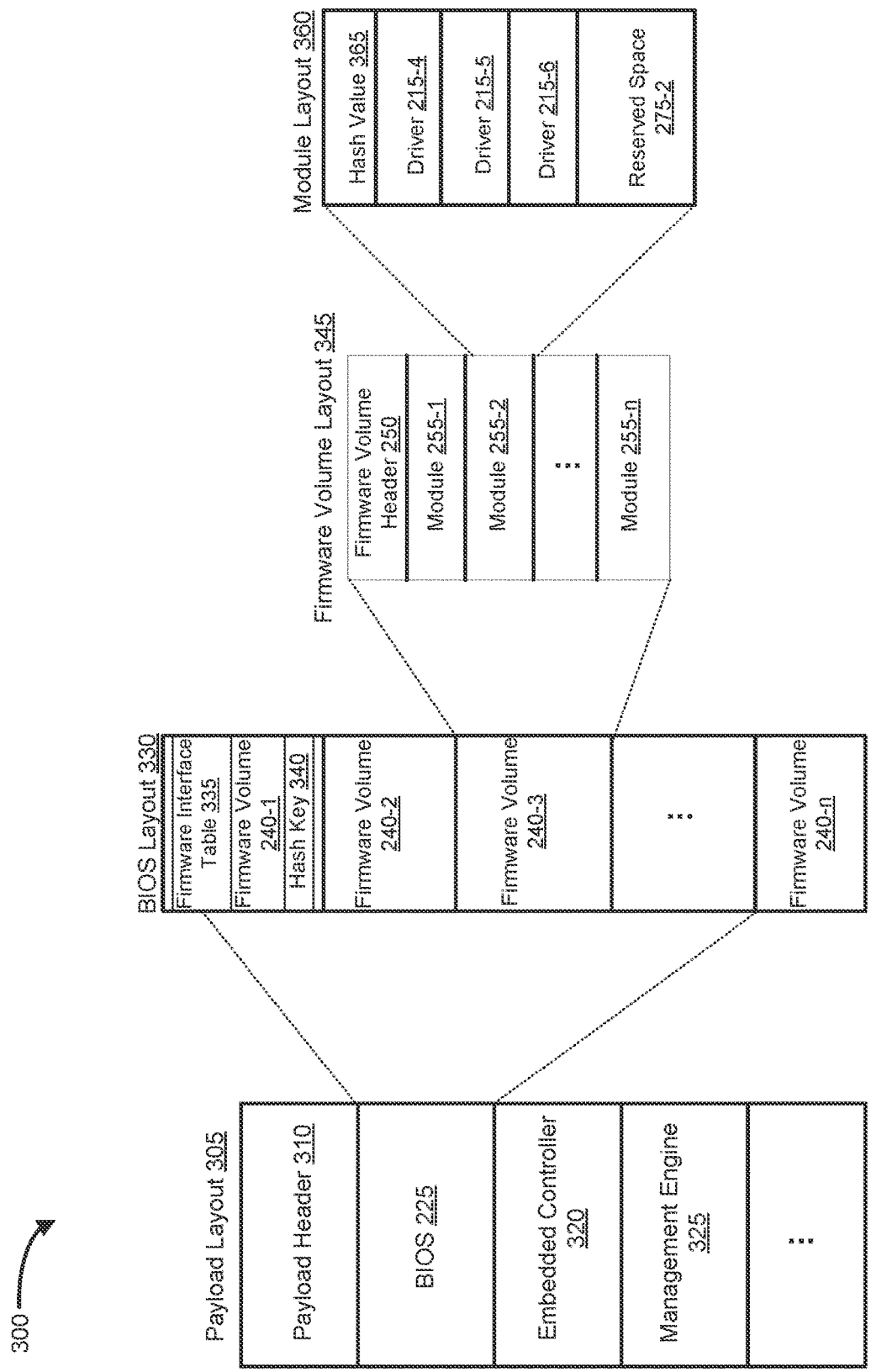
FIG. 3 is a diagram of a flash file structure, according to an embodiment of the present disclosure.

FIG. 3 shows a diagram of a flash file structure 300 that is configured to support modular flash memory updates. Flash file structure 300 may be a layout of a firmware update payload package for updating one or more firmware images in the flash memory. In this example, the firmware file update includes updates to BIOS 225, an embedded controller 320, a management engine 325, etc. The aforementioned firmware updates may be arranged according to a payload layout 305. Payload header 310 may include information associated with the firmware update payload. For example, payload header 310 may include a globally unique identifier of the payload, identifier and number of firmware images, size, and version of each firmware image, etc. Each firmware image may include updates to a collection of firmware routines, device drivers, and/or other software programs. A particular firmware is typically assigned a revision or version number identifying the collection of routines or files included in the firmware which is typically a newer version than the firmware image previously published and/or used by a consumer.

Each firmware image update may be structured according to a layout similar to a BIOS layout 330 which includes firmware volumes 240-1 through 240-n. Firmware volume 240-1 may include a firmware interface table 335 and a hash key 340. Firmware interface table 335 is a data structure that includes various entries such as a starting address and attributes of different components of BIOS 225. Hash key 340 may be a hash value of an individual or a set of drivers organized according to the firmware file system. Firmware interface table 335 and hash key 340 may include a certificate and hash values of the firmware volumes which allows integrity validation of an initial boot block and an original equipment manufacturer boot block during the boot process. Each firmware volume may be organized into firmware modules, also referred to herein simply as modules. Accordingly, the hash value may be a hash value of one or more modules. This allows the identification of a modified region between two versions of firmware, such as BIOS firmware, during a flash memory update at a module, driver, file, and/or sector level.

Each one of firmware volumes 240 may be configured according to a firmware volume layout 345, wherein each firmware volume includes a firmware header and one or more firmware modules. For example, firmware volume layout 345 includes a firmware volume header 250 and modules 255-1 through 255-n. Each module may be configured according to a module layout, wherein each module includes a hash value and one or more drivers or files. The hash value may be calculated based on a set of drivers or files in the module. For example, module 255-2 may be configured according to module layout 360 which includes a hash value 365, drivers 215-4, 215-5, and 215-6, and a reserved space 275-2. A reserved space may be an extensible memory pool that can be utilized by one or more drivers in the module.

Instead of a firmware volume typically having a reserved space at the end of the firmware volume to accommodate new code updates, a reserved space is included at the end of each module. Each module may be hashed but the reserved space may be excluded from the hash calculation to accommodate new code updates within the module. This also allows using a reserved space for other modules in the firmware volume to be utilized if the reserved space of a module being updated is full. Accordingly, hash value 365 may be a unique numerical or alphanumerical value that is generated when drivers 215-4, 215-5, and 215-6 are hashed. The drivers may be hashed by using a message digest algorithm, a secure hash algorithm, or similar. Each one of drivers 215-4, 215-5, and 215-6 may include a device driver firmware code. If the contents of drivers 215-4, 215-5, and 215-6 are modified, the value of hash value 365 may change.

The layouts shown are not drawn to scale and may include additional or fewer components. The depicted flash file structure does not convey or imply any architectural or other limitations with respect to the presently described embodiments and/or the general disclosure. In the discussion of the figures, reference may also be made to components illustrated in other figures for continuity of the description.

Figure 4:
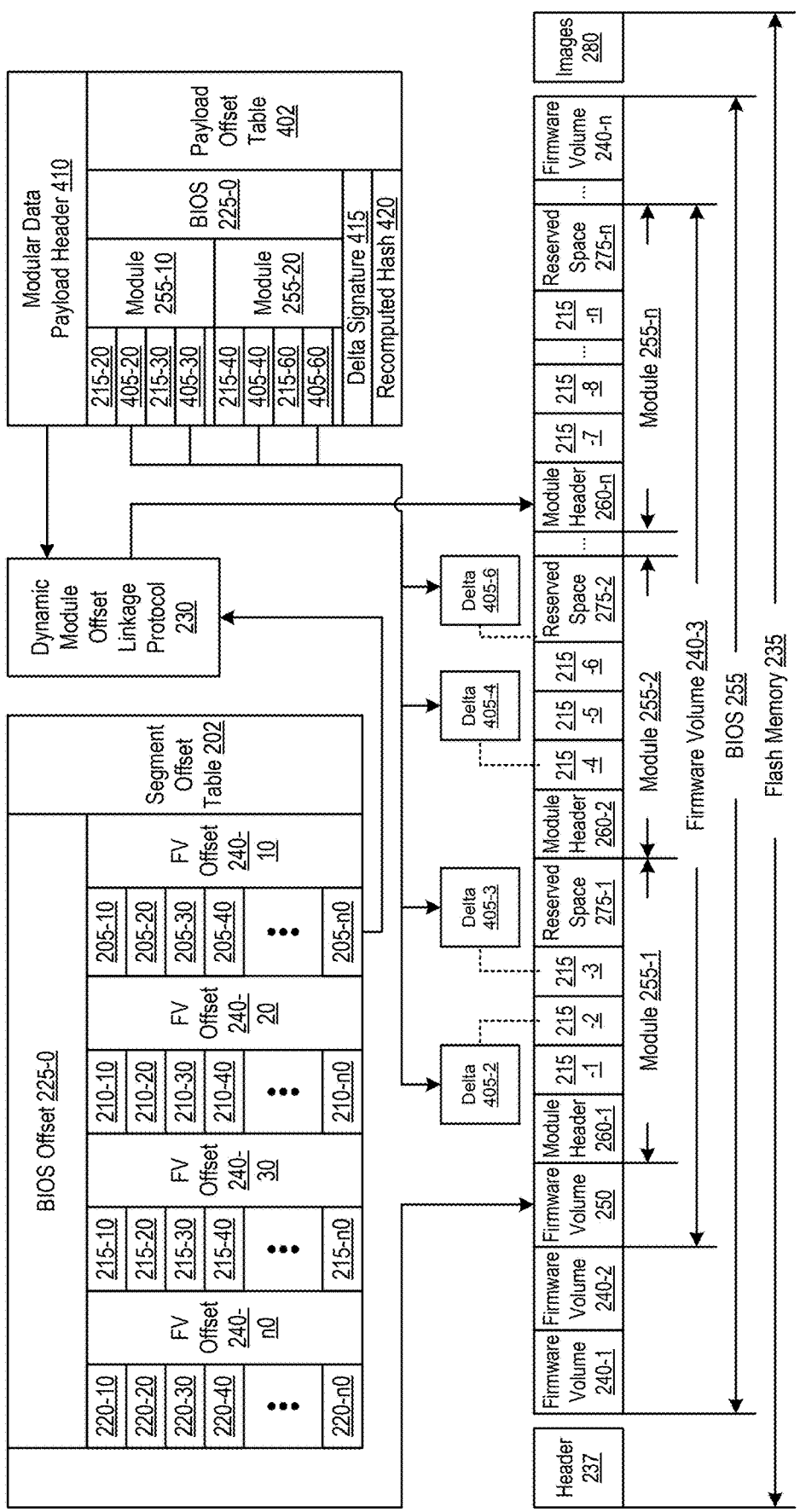
FIG. 4 is a diagram of a flash firmware architecture with an updated basic input/output system firmware image, according to an embodiment of the present disclosure.

FIG. 4 shows a diagram of architecture 200 with an updated BIOS firmware based on the firmware update payload shown in FIG. 2. The diagram includes a payload offset table 402 which may have been generated by an artificial intelligence engine during the update process. Payload offset table 402 may include dynamic links of overflow offsets. In this example, dynamic module offset linkage protocol 230 may be configured to track update segment offsets and generate a dynamic linkage database, referred to herein as payload offset table 402. Payload offset table 402, which is generated by an artificial intelligence engine in FIG. 5, includes dynamic links of overflow offsets associated with a new module whose size does not fit in the current flash map which helps during loading the split module at runtime. Accordingly, payload offset table 402 includes various information associated with split binaries. Dynamic module offset linkage protocol 230 may also use payload offset table 402 to load a split module from different offsets of flash memory and execute it as a single executable.

In this example, driver 215-2 has been updated to include a delta 405-2 which is based on the binary of driver 215-2 and binary included in BIOS firmware update depicted in FIG. 3. Driver 215-3 may have also been updated to include delta 405-3 which is also depicted to have an overflow data stored in reserved space 275-1. Driver 215-4 is shown to have been updated with delta 405-4 while driver 215-6 has been updated with delta 405-6 that is stored in reserved space 275-2 as space in driver 215-6 may have been full. These relationships may be mapped at payload offset table 402, which also includes a modular delta payload header 410, a delta signature 415, and recomputed hash 420. Recomputed hash 420 may be calculated based on the updated modules, drivers, and/or files. Payload offset table 402 may be maintained in a module header, such as module header 260-n by dynamic module offset linkage protocol 230.

Figure 5:
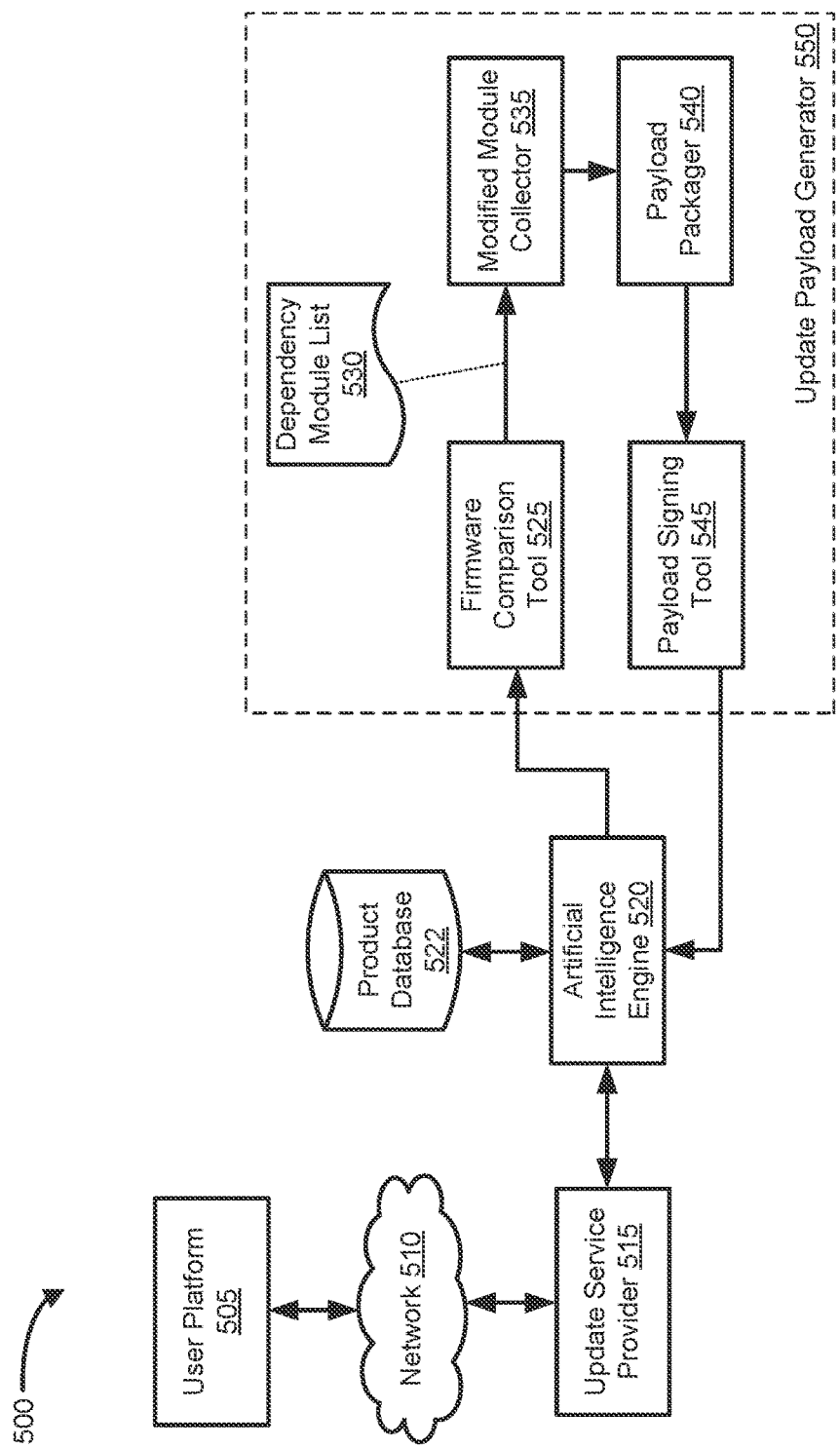
FIG. 5 is a diagram of a system for artificial intelligence-based modular flash payload generation, according to an embodiment of the present disclosure.

FIG. 5 shows a diagram of a system 500 for artificial intelligence-based modular flash payload generation to aid in a light-weight firmware update. System 500 includes a user platform 505, a network 510, an update service provider 515, an artificial intelligence engine 520, a product database 522, and an update payload generator 550. Update payload generator 550 includes a firmware comparison tool 525, a modified module collector 535, a payload packager 540, and a payload signing tool 545.

Each of these components can be implemented with hardware and/or software, including virtual machines. Components of system 500 may be implemented as a single management server or a plurality of virtual or physical servers which may or may not be geographically co-located. For example, update service provider 515, artificial intelligence engine 520, and/or other aspects of system 500 may be hosted in a cloud-based hosting service. In addition, although update payload generator 550 is shown separately from artificial intelligence engine 520, update payload generator 550 may be included or part of artificial intelligence engine 520. Further, update payload generator 550, artificial intelligence engine 520, and product database 522 may be hosted by update service provider 515.

User platform 505 may be an information handling system that is similar to information handling system 100 of FIG. 1. In addition, in this example, user platform 505 may include a flash memory that is configured according to architecture 200 of FIG. 2. Network 510 may be a public network, such as the internet, a physical private network, a wireless network, a virtual private network, or any combination thereof. Update service provider 260 may be maintained by a manufacturer of user platform 505 wherein a user of user platform 505 may get the latest updates of various products associated with user platform 505. Product database 522 may be an online repository sorted by original design manufacturer platform type firmware images which may be released to users.

Artificial intelligence engine 520 may be configured to perform an offline flash firmware update processing which includes comparing existing or current system firmware and a new system firmware based on a flash memory layout and generating a modular update package and a new flash map, such as payload offset table 402 of FIG. 4. The new flash map may be configured to fit with the user's flash memory or SPI flash. In addition, artificial intelligence engine 520 may also generate a dynamic linkage database based on deltas determined during the comparison. This allows a module to grow or shrink in size irrespective of the size of a new module.

In particular, artificial intelligence engine 520 may retrieve the current system firmware image and the new system firmware image from product database 522. The images may be compared at the sector level by firmware comparison tool 525 and determine deltas between the images based on flash file structure 300 of FIG. 3 and architecture 200 of FIG. 2. Firmware comparison tool 525 may then generate flash offsets based on the deltas to fit on the user's flash or SPI memory. The flash offsets may also accommodate overflow data, wherein data of a module, drive, or file may be split because the module, drive, or file is already full, such that the overflow data may be accommodated by one or more reserved space of the firmware volume. The solution may also be capable of finding space at reserved spaces across firmware volumes within the firmware image.

Modified module collector 535 may gather modified modules which include the delta binaries and dependency modules based on a dependency module list 530. Modified module collector 535 may transmit the modules to payload packager 540 which may then generate a payload package of the received modules. Payload packager 540 may transmit the payload package to payload signing tool 545 which generates a hash value and signs the payload package which it then transmits to artificial intelligence engine 520 to be published. The payload package, which is similar to the firmware update payload package of FIG. 3, does not carry full platform firmware images. Instead, the payload package carries a delta payload and its offset definitions in a segment offset table in the firmware volume header. The payload package may also include signatures and hash values for the delta payload. When the payload package is downloaded, the segment offset table which includes platform offset definitions and the delta payload offsets, which includes offset definitions of the modified modules in the payload package, may be interpolated. The interpolation may result in generating a new flash offset map or a ne segment offset table with a new platform offset definitions. The new segment offset table may overwrite the previous segment offset table saved in the firmware volume header. In addition, a payload offset table may be generated if there are modules to be split. The dynamic module offset linkage protocol may be used to locate the offsets on the flash memory or SPI flash using the flash offset map or the segment offset table with the payload offset table and update the system firmware in user platform 505 with the delta payload received from artificial intelligence engine 520 as depicted in FIG. 4.

Figure 6:
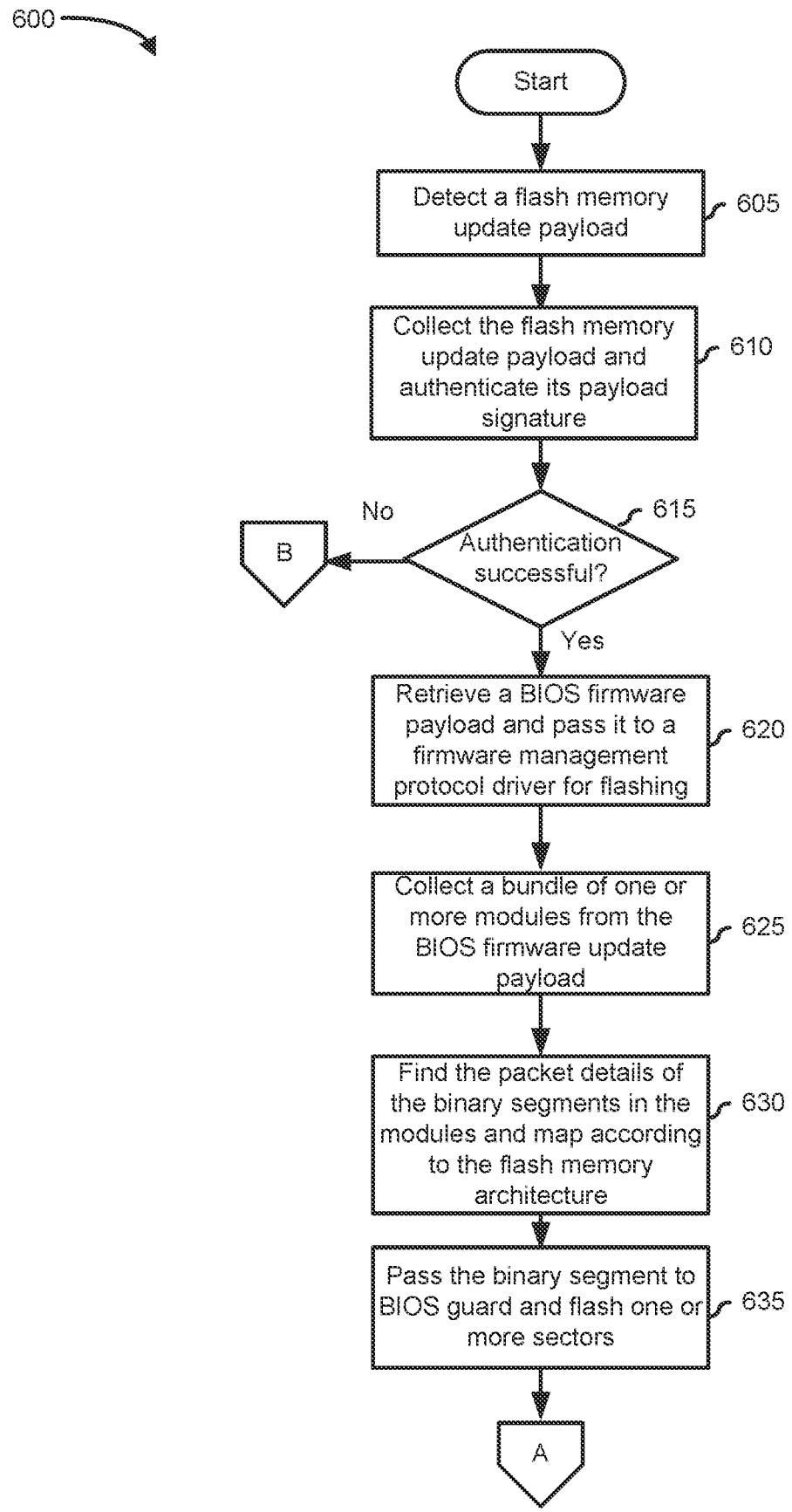
FIGS. 6 and 7 are flowcharts of a method for performing a modular firmware flash process, according to an embodiment of the present disclosure.

FIG. 6 shows a method 600 for performing a modular firmware flash process. Embodiments of method 600 in the present disclosure are described in terms of architecture 200 of FIG. 2 and a flash file structure 300 of FIG. 3. However, it should be recognized that other architecture and/or layouts may be utilized to perform the described method. One of skill in the art will appreciate that this flowchart explains a typical example, which can be extended to advanced applications or services in practice.

Method 600 typically starts at block 605 where a processor detects a flash memory update payload. For example, block 605 may be triggered by a receipt of a flash memory update payload. The flash memory update payload may include an update to one or more firmware that includes modular updates to one or more modules. The flash memory update payload may include one or more firmware updates and a structure similar to flash file structure 300 of FIG. 3. The method may proceed to block 610 where the processor may collect the flash memory update payload and authenticate its signature.

At decision block 615, the method may determine whether the authentication is successful. If the authentication is successful, then the "YES" branch is taken, and the method proceeds to block 620. If the authentication is not successful, then the "NO" branch is taken, and the method ends. At block 620, the processor may retrieve a BIOS firmware payload, such as BIOS 225, and pass it to the BIOS firmware management protocol for flashing.

The method proceeds to block 625 where the processor may collect a set of one or more modular bundles from the BIOS firmware payload. For example, the processor may collect modules 255-1 through 255-n of BIOS 225 in FIG. 3. The method proceeds to block 630 where the processor may find the packet details of the binary segments in the modules. The processor may then map the module updates based on the packet details to the BIOS in the flash memory. The packet details include information about the destination firmware module such as its offset and length. Based on this information, the processor may map the modular payload from the BIOS firmware payload to its corresponding firmware modules in the flash memory or SPI flash to determine which section in the flash memory or SPI flash is to be updated based on segment offset table 202 that is maintained in firmware volume header 250.

The method may proceed to block 635 where the processor may pass the binary segments to a BIOS guard and flash one or more sectors based on the binary segment's packet details and/or offsets in segment offset table 202. The processor may pass information associated with offsets of the destination of the binary segments in the flash memory or the SPI flash along with the length of the binary segments and/or its destination. The method may proceed to block 705 of FIG. 7.

Figure 7:
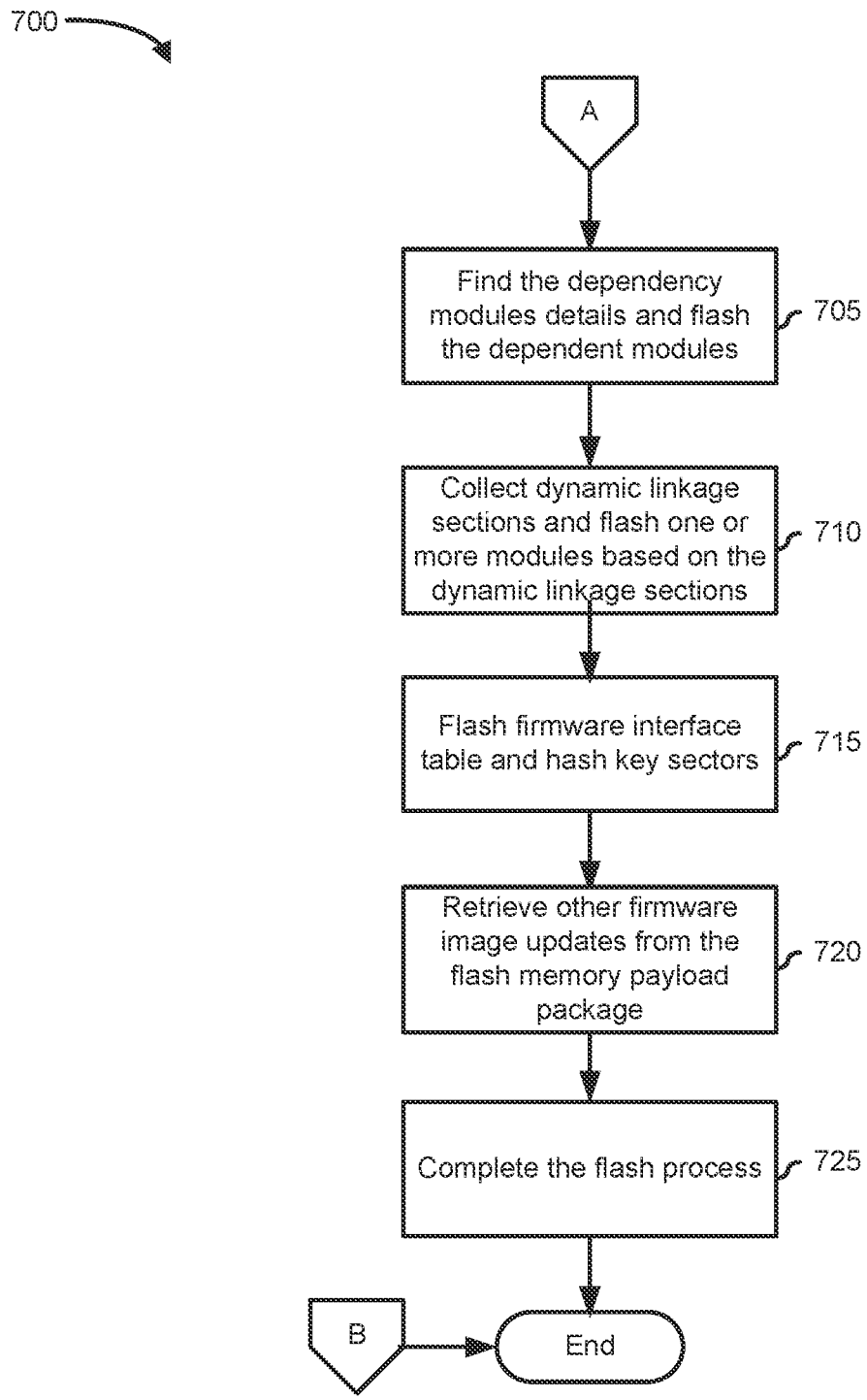

FIG. 7 shows a method 700 which is a continuation of method 600 of FIG. 6. Method 700 typically starts at block 705 where the processor may find dependency module details associated with the binary segments and flash the dependent modules. For example, the processor may determine offsets and/or length of the dependent modules. The method may proceed to block 710 where the processor may collect dynamic linkage sections and flash or update associated modules based on the dynamic linkage sections. The update may be performed using the dynamic module offset linkage protocol and/or segment offset table 202. The dynamic linkage sections may reflect a scenario wherein a reserved space at the end of a module becomes full due to updates for that module. Accordingly, additional updates for that module cannot be accommodated by the reserved space. At this point, changes that cannot be accommodated in the module may be split into at least two parts, wherein the first part may be a portion that can still be accommodated by the reserved space while the second part may be stored in a reserved space of another module. The dynamic linkage sections may include a dynamic linkage database may include details that include information associated with the driver that has been split into at least two parts, such as the location of the reserved space in the other portion where the second part of the driver is stored. During an update of the driver, if the update process detects that the firmware update payload includes a driver that is split across multiple modules due to size restrictions, the processor may look for the dynamic linkage database and retrieve the information associated with the location of the data that are stored in other modules. The update process may also determine the dependencies of the driver that is split and flash the module(s) associated with the dependencies.

During the flashing of the BIOS firmware, if the processor detects that the module being processed includes a driver that is split across multiple modules in the flash memory, the processor may look for a dynamic module offset linkage database in the firmware update payload or the flash memory update payload and retrieve associated details. For example, the processor may get information on which module contains the rest of the driver and collect that packet or module and flash that module as well. This module may also be referred to as a dependency of the current module being processed. Accordingly, a BIOS firmware update related to a security vulnerability, a third-party code update, and common feature fixes may update only the modified regions in the flash memory or SPI flash by identifying deltas between a current firmware image and a new firmware update payload. This reduces flash time, the risk of corruption during the flash, and bad user experience.

The method may proceed to block 715 where the processor may flash the firmware interface table and the hash key sectors, such as firmware interface table 335 and hash key 340 of FIG. 3, also referred to as a firmware payload signature. The hash key sector may include a table that includes a public key, hash key, and related information which can be used to validate the integrity of the BIOS firmware at runtime.

The method may proceed to block 720 where the processor retrieves other firmware updates from the flash memory update payload package. For example, the processor may retrieve embedded controller 320 and management engine 325 of the flash memory update payload of FIG. 3. The method may proceed to block 725 where it completes the flash process by flashing the other firmware updates to the flash memory.

Figure 8:
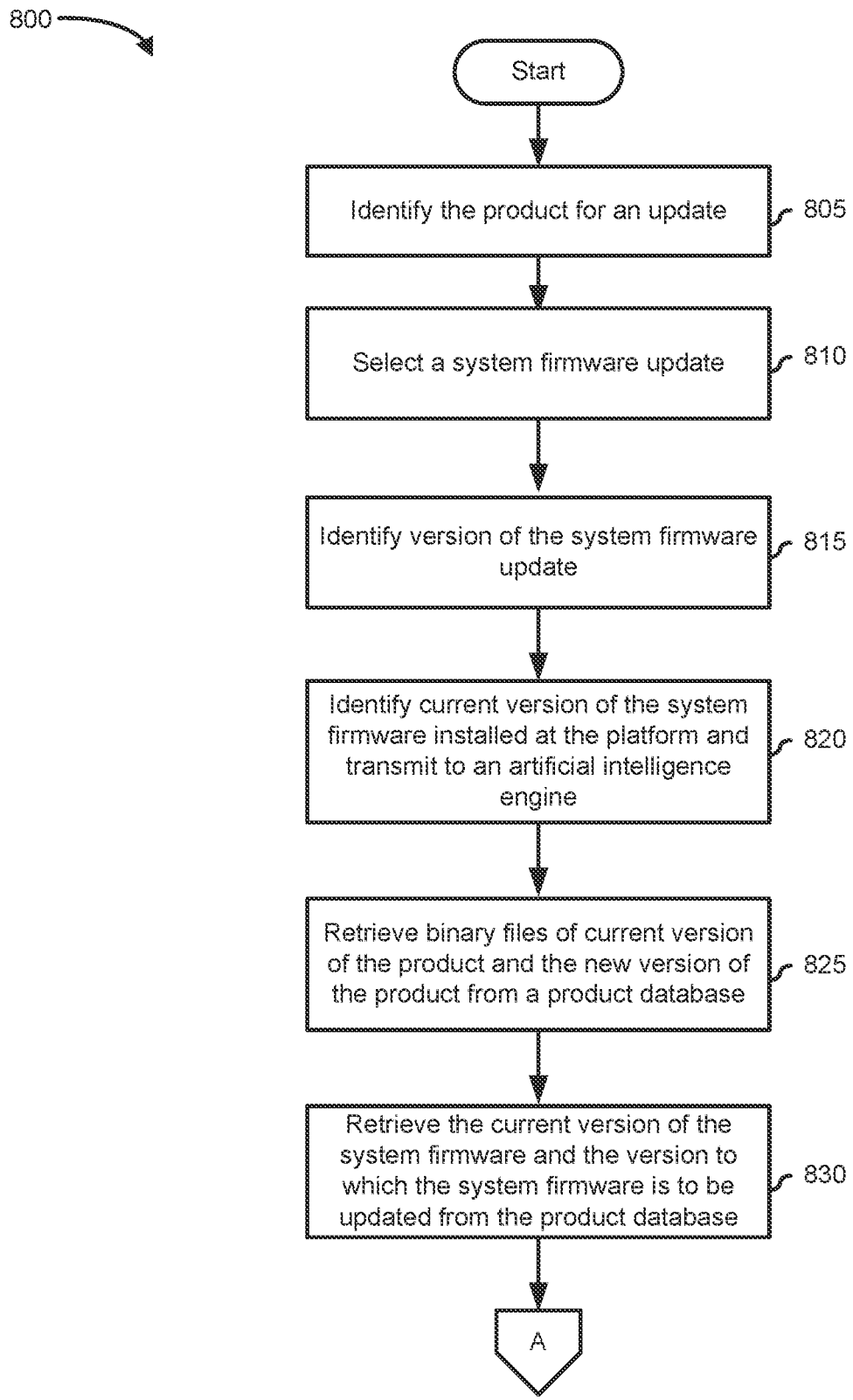
FIGS. 8 and 9 are flowcharts of a method for flash memory update payload creation, according to an embodiment of the present disclosure.

FIG. 8 shows a method 800 for flash memory update payload creation at runtime. In particular, method 800 may generate or build a flash memory update package according to a flash file structure, sign the generated package, and upload it to an update site for users to download and update their platforms. In building the flash memory update package, the method may interpolate a user's flash memory offsets with offsets of a new system firmware payload and generate a write-only flash memory offset map to support a dynamic flash update at a sector level. In addition, the method may also determine module dependencies for each module or driver of the new system firmware payload. The method may include the dependency modules along with the modified modules in the flash memory update package. An artificial intelligence engine may generate a dynamic offset linkage database, similar to payload offset table 402 of FIG. 4 in the system firmware payload. The dynamic offset linkage database may enable scaling of delta updates across modules or firmware volumes within an image such that module size extension is accommodated without corruption.

Embodiments of method 800 in the present disclosure are described in terms of architecture 200 of FIG. 2, flash file structure 300 of FIG. 3, and segment offset table mapping to payload offset table of FIG. 5. However, it should be recognized that other architecture, structure and/or systems may be utilized to perform the described method. One of skill in the art will appreciate that this flowchart explains a typical example, which can be extended to advanced applications or services in practice.

Method 800 typically starts at block 805 wherein the processor at an update site may identify a product for update. For example, the update site may first request a service tag. The update site may also detect platform details of the user's information handling system. The method may proceed to block 810 where the processor and/or the user may select a system firmware update based on the product identified and/or the platform details. For example, the processor may select a BIOS firmware and related driver(s) to be updated. The method may proceed to block 815 where the processor identifies the version of the system firmware update. In another embodiment, a user may enter the version in an interface. For example, the processor may identify the product BIOS version. The user may also enter the product BIOS version using an interface of the product update site. The method may proceed to block 820 where the processor may determine the version of the product's BIOS that is currently installed in the information handling system and send the product version to an artificial intelligence engine.

The artificial intelligence engine may be configured to perform offline processing of the firmware update, wherein the artificial intelligence engine may prepare modular payload offsets based on the current version of the system firmware or the BIOS that is installed in the user's information handling system. Accordingly, the method may proceed to block 825 wherein the artificial intelligence engine may retrieve binary files of the version of the system firmware or the BIOS that is currently installed in the platform. The artificial intelligence engine may also retrieve binary files of a system firmware update. Both sets of binary files may be stored in a product database that may be located remotely and maintained by the manufacturer of the platform or a third party. The method may proceed to block 830 where the artificial intelligence engine may retrieve the current version of the system firmware installed in the platform and the version to which the system firmware is to be updated from the product database. The method may proceed to block 905 of FIG. 9.

Figure 9:
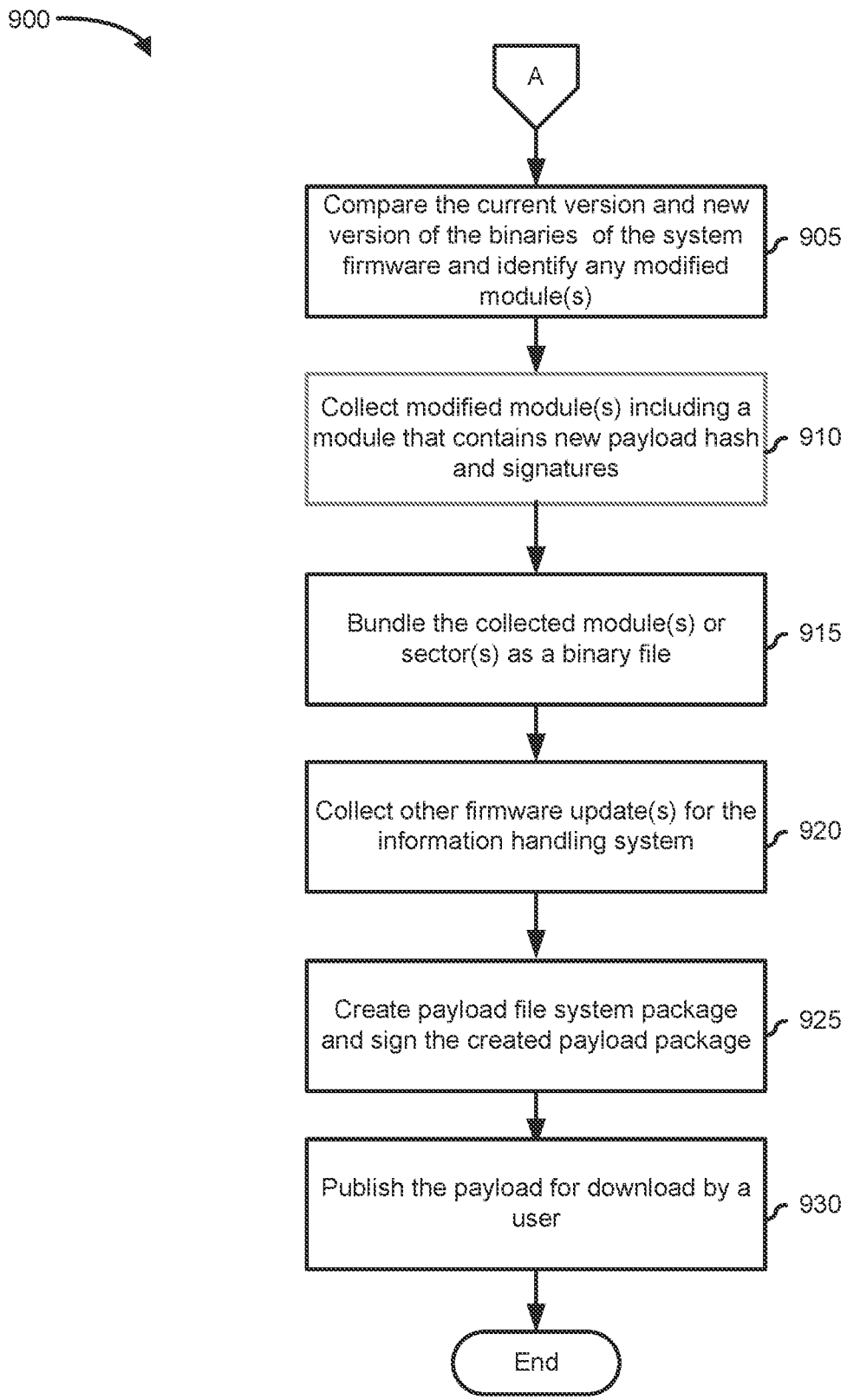

FIG. 9 shows a method 900 which is a continuation of method 800 of FIG. 8. Method 900 typically starts at block 905 wherein a firmware comparison tool may compare the binaries of the current version and the new version of the system firmware and identify any modified module(s) or sector(s) between the two versions. The firmware comparison tool may also calculate a hash of the modified module(s) or sector(s) and sign the modified module(s) or sector(s). The method may proceed to block 910 where a modified module collector may collect the modified module(s) or sector(s) including a module that contains the payload hash and signatures. The modified module(s) or sector(s) reflects the deltas between the current version and the new version of the system firmware. The modified module collector may also collect the modified module(s) or sector(s) module dependency list if any. The method may proceed to block 915 where a payload packager may bundle the collected module(s) or sector(s) as a binary file. The bundle may also include offset definitions in a segment offset table, wherein the offset definitions are based on the deltas depicted in the modified modules or sectors. The method may proceed to block 920 where the modified module collector may collect the other firmware update(s) for the platform or information handling system. These collected firmware updates may also be bundled as another binary file(s).

The method may proceed to block 925 where the payload packager may create a payload file system package based on the binary files and sign the created payload package. The process of converting the raw firmware binary file(s) into the payload file system package may be performed at runtime.

The method may proceed to block 930 where the payload packager may publish the payload package for download by the user.

As used herein, a hyphenated form of a reference numeral refers to a specific instance of an element and the unhyphenated form of the reference numeral refers to the collective or generic element. Thus, for example, firmware volume "240-1" refers to an instance of a widget class, which may be referred to collectively as firmware volume "240" and any one of which may be referred to generically as a firmware volume "240."

Although FIG. 6, FIG. 7, FIG. 8, and FIG. 9 show example blocks of method 600, method 700, method 800, and method 900 in some implementations, 600, method 700, method 800, and method 900 may include additional blocks, fewer blocks, different blocks, or differently arranged blocks than those depicted in FIG. 6, FIG. 7, FIG. 8, and FIG. 9. Those skilled in the art will understand that the principles presented herein may be implemented in any suitably arranged processing system. Additionally, or alternatively, two or more of the blocks of method 600, method 700, method 800, and method 900 may be performed in parallel. For example, blocks 630 and 635 of method 600 may be performed in parallel.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein.

When referred to as a "device," a "module," a "unit," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The present disclosure contemplates a computer-readable medium that includes instructions or receives and executes instructions responsive to a propagated signal; so that a device connected to a network can communicate voice, video, or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes, or another storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents but also equivalent structures.

What is claimed is:

1. An information handling system, comprising:
    a flash memory including a basic input/output system (BIOS) firmware image having a modular file structure and a segment offset table that identifies offsets of a first set of modules including the firmware image, wherein the first set of modules includes a first reserved space of a first module; and
    a processor configured to:
        collect a second set of modules having the modular file structure from a BIOS firmware update payload and map the second set of modules to the first set of modules in the flash memory;
        update the BIOS firmware image with the second set of modules based on the offsets in the segment offset table; and
        in response to a determination that the first reserved space of the first module in the flash memory is full, store overflow data from the second set of modules in a second reserved space of a second module.

2. The information handling system of claim 1, wherein the second set of modules may be mapped to the first set of modules based on packet details included in the BIOS firmware update payload.

3. The information handling system of claim 2, wherein the packet details include offsets of destination modules in the firmware image.

4. The information handling system of claim 1, wherein the modular file structure includes a firmware volume header configured to store the segment offset table.

5. The information handling system of claim 1, wherein the processor is further configured to calculate a hash value based on a set of drivers.

6. The information handling system of claim 1, wherein the processor is further configured to collect information associated with drivers that are split into at least two modules.

7. The information handling system of claim 1, wherein the processor is further configured to retrieve other firmware image updates from an update package.

8. A method comprising:
providing a flash memory including a basic input/output system (BIOS) firmware image having a modular file structure and a segment offset table that identifies offsets of a first set of modules including the firmware image, wherein the first set of modules includes a first reserved space of a first module;
collecting, by a processor, a second set of modules having the modular file structure from a BIOS firmware update payload and mapping the second set of modules to the first set of modules in the flash memory;
updating the BIOS firmware image with the second set of modules based on the offsets in the segment offset table; and
in response to determining that the first reserved space of the first module in the flash memory is full, storing overflow data from the second set of modules in a second reserved space of a second module.

9. The method of claim 8, wherein the second set of modules may be mapped to the first set of modules based on packet details included in the BIOS firmware update payload.

10. The method of claim 9, wherein the packet details include offsets of destination modules in the firmware image.

11. The method of claim 8, wherein the modular file structure includes a firmware volume header configured to store the segment offset table.

12. The method of claim 8, further comprising calculating a hash value based on a set of drivers.

13. The method of claim 8, further comprising collecting information associated with drivers that are split into at least two modules.

14. The method of claim 8, further comprising retrieving other firmware image updates from an update package.

15. A non-transitory computer-readable medium to store instructions that are executable to perform operations comprising:
providing a flash memory including a basic input/output system (BIOS) firmware image having a modular file structure and a segment offset table that identifies offsets of a first set of modules including the firmware image, wherein the first set of modules includes a first reserved space of a first module;
collecting a second set of modules having the modular file structure from a BIOS firmware update payload and mapping the second set of modules to the first set of modules in the flash memory;
updating the BIOS firmware image with the second set of modules based on the offsets in the segment offset table; and
in response to determining that the first reserved space of the first module in the flash memory is full, storing overflow data from the second set of modules in a second reserved space of a second module.

16. The non-transitory computer-readable medium of claim 15, wherein the second set of modules may be mapped to the first set of modules based on packet details included in the BIOS firmware update payload.

17. The non-transitory computer-readable medium of claim 16, wherein the packet details include offsets of destination modules in the firmware image.

18. The non-transitory computer-readable medium of claim 15, wherein the modular file structure includes a firmware volume header configured to store the segment offset table.

19. The non-transitory computer-readable medium of claim 15, wherein the operations further comprise collecting information associated with drivers that are split into at least two modules.

20. The non-transitory computer-readable medium of claim 15, wherein the operations further comprise retrieving other firmware image updates from an update package.

\* \* \* \* \*